Jan. 15, 1929.
A. G. RONNING ET AL
1,699,252
HARVESTER
Filed July 5, 1924     4 Sheets-Sheet 1
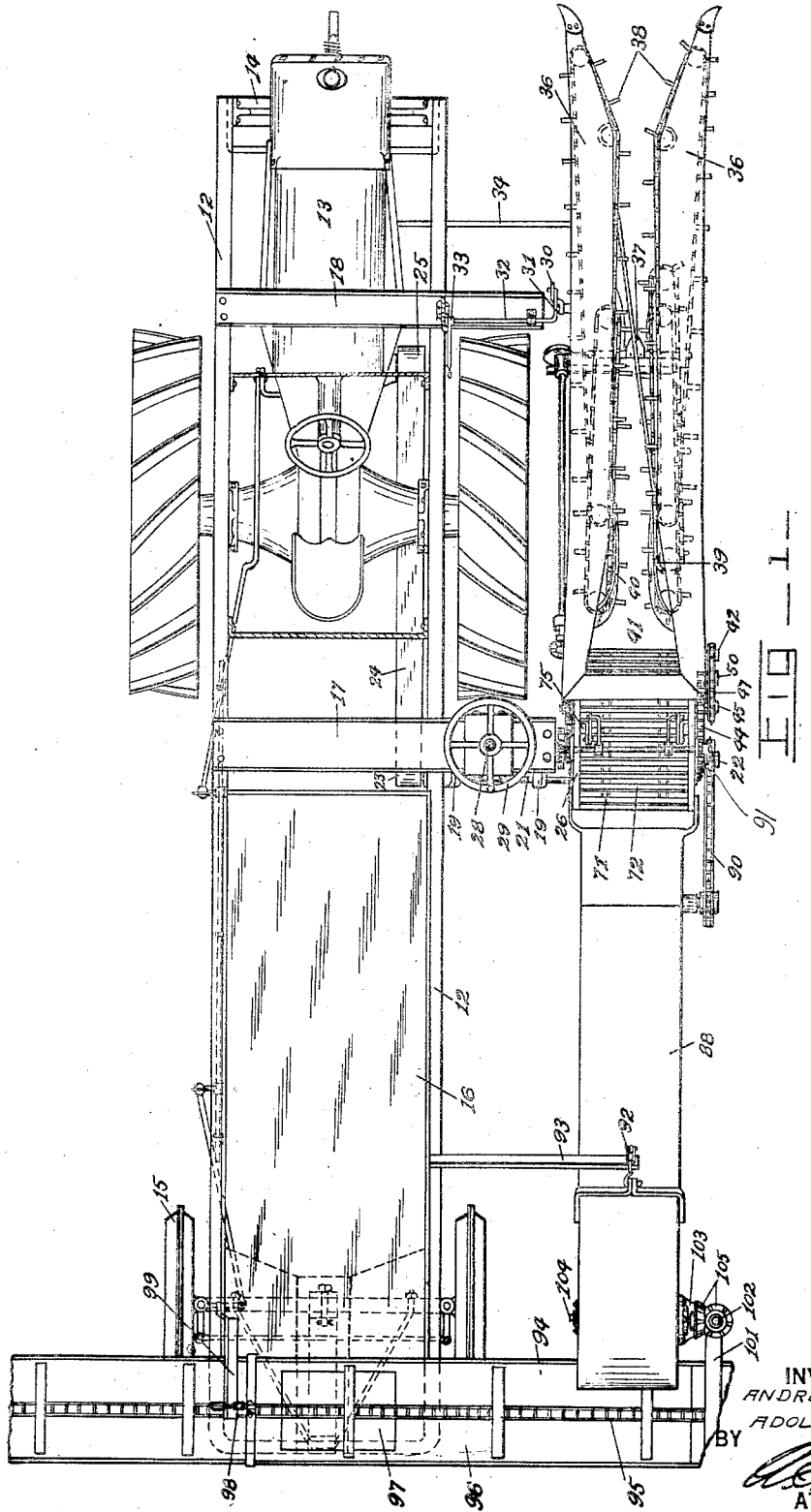
INVENTORS
ANDREAN G. RONNING
ADOLPH RONNING
BY
ATTORNEY Jan. 15, 1929.　　　　　　　　　　　　　　　　　　1,699,252
A. G. RONNING ET AL
HARVESTER
Filed July 5, 1924　　　　4 Sheets-Sheet 2
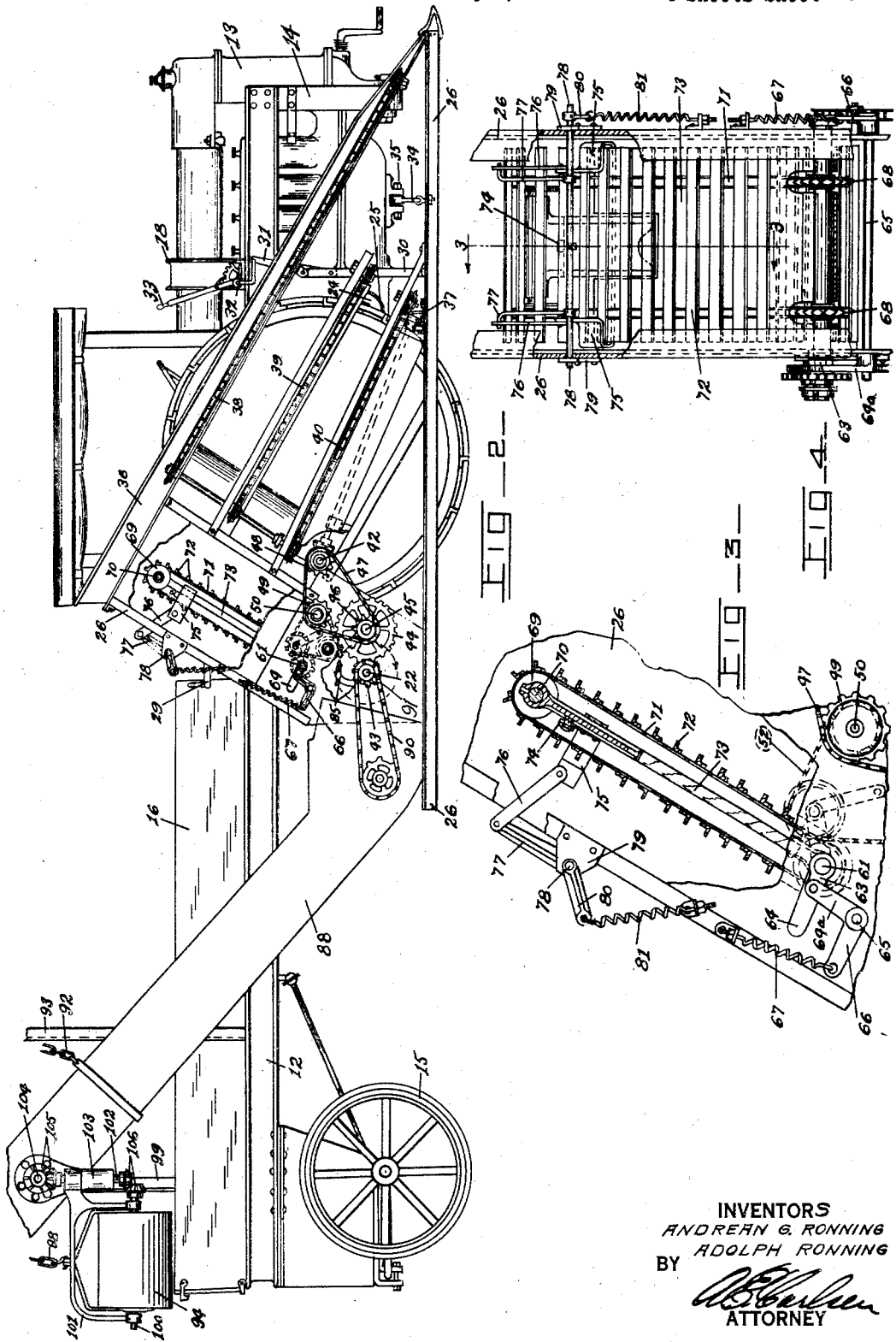
INVENTORS
ANDREAN G. RONNING
ADOLPH RONNING
BY
ATTORNEY

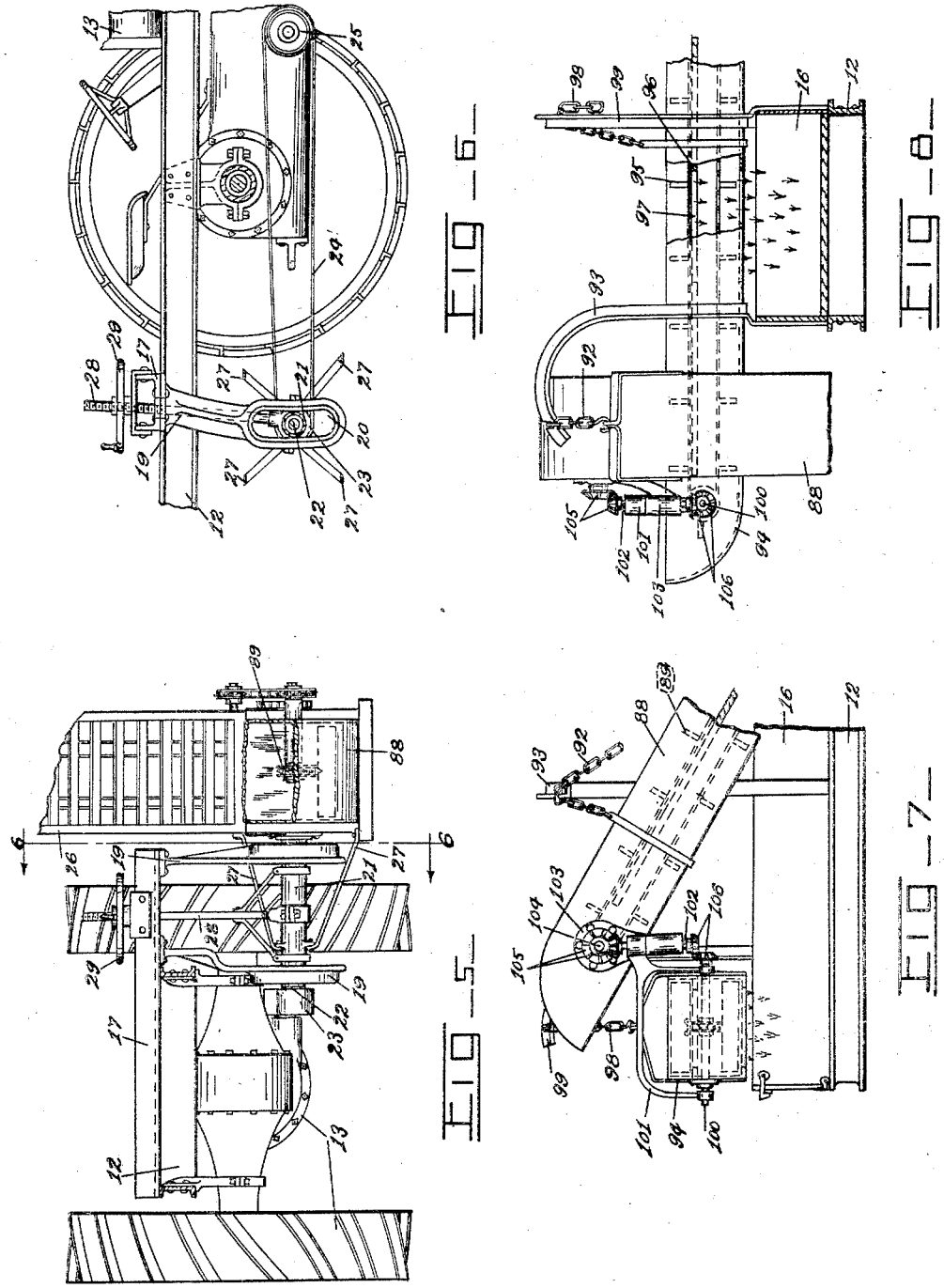

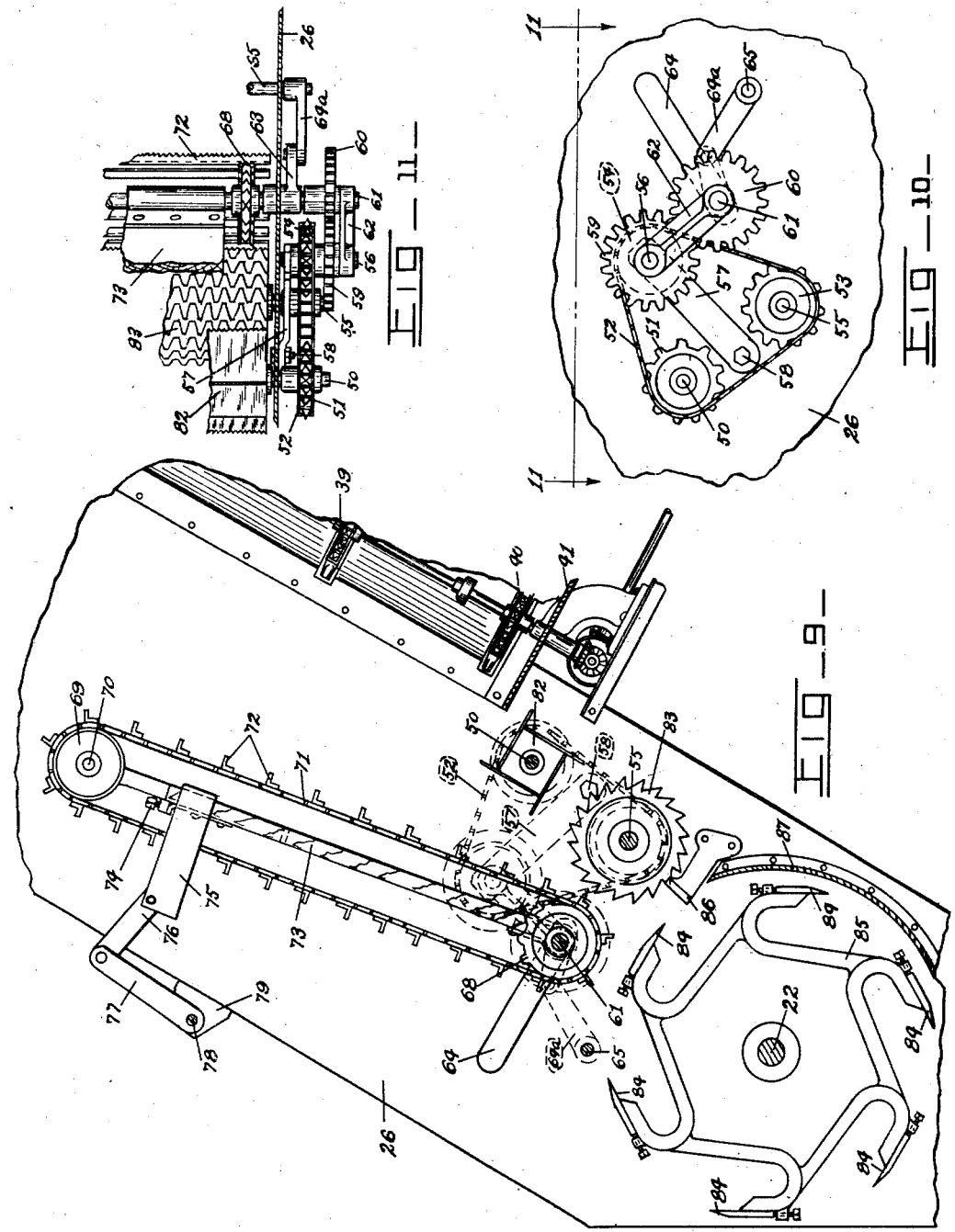

Patented Jan. 15, 1929.

1,699,252

UNITED STATES PATENT OFFICE.

ANDREAN G. RONNING AND ADOLPH RONNING, OF MINNEAPOLIS, MINNESOTA; JACOB A. RONNING AND ADOLPH RONNING EXECUTORS OF SAID ANDREAN G. RONNING, DECEASED.

HARVESTER.

Application filed July 5, 1924. Serial No. 724,422.

This invention relates to harvesting machinery and the main object is to provide a practical and efficient harvester of the type used for cutting corn ensilage and for certain improvements in the harvester more particularly as shown and described in our United States Patent No. 1,340,461, of May 18th, 1920, and as shown in our co-pending application Ser. No. 657,176, filed August 13th, 1923. A further object is to provide means, of a novel nature for supporting and driving the harvester from a tractor, such tractor and its frame construction also being broadly illustrated and claimed in a co-pending application for patent Serial No. 717,511, filed on June 3rd, 1924. Further and more specific objects will be disclosed in the course of the following specification, reference being had to the accompanying drawings, in which:

Fig. 1 is a plan view of the entire machine.

Fig. 2 is a right side elevation of the machine, a fractional portion being broken away.

Fig. 3 is an enlarged view of a portion of the machine as shown in Fig. 2, or as seen substantially on the line 3—3 in Fig. 4.

Fig. 4 is a detail elevation of a portion of the machine, as seen from the left in Fig. 3.

Fig. 5 is a rear view of the machine with various parts broken away or removed.

Fig. 6 is a detail sectional elevation as seen on the line 6—6 in Fig. 5.

Fig. 7 is a detail view of the upper end of the carrier mechanism.

Fig. 8 is a detail view as seen from the right in Fig. 7, fractional portions being broken away.

Fig. 9 is an enlarged detail section showing the arrangement of the cutting and feeder mechanism.

Fig. 10 is a detail view of a power transmitter device as reversed and transposed from the rear or far side of the structure shown in Fig. 9.

Fig. 11 is a top view of the mechanism shown in Fig. 10, and as transposed therefrom.

Referring to the drawings more particularly and by reference characters, 12 designates an auxiliary frame which is secured to a tractor 13, a yoke 14 of the frame being substituted for the steering truck 15, which is then applied to the rear end of the frame, as described in the aforesaid mentioned application Serial No. 717,511. The rear part of the frame 12 supports a wagon box or container 16, and forwardly thereof is secured a pair of transverse cross bars or beams 17 and 18, which project, at their right ends, laterally from the frame and beyond the tractor to form suitable main supports for the harvester.

The outer end of the beam 17 is provided, as shown especially in Figs. 1, 5 and 6, with a pair of spaced depending yokes 19 having arcuate guide slots 20, in which is adjustably guided a bearing member 21 in which is journaled the main harvester drive shaft 22. The inner end of the shaft 22 has a pulley 23 which is driven by a belt 24 from the usual power pulley 25 of the tractor. The harvester frame 26 is rigidly secured upon the outer end of the member 21 and is braced by suitable means such as brace rods 27. The vertical adjustment of the member 21, and also the harvester frame and pulley 23, is effected by means of a vertical bar 28 whose lower end is rigidly connected to the member 21, while its upper end is threaded and screws into a hand wheel 29, which is rotatably secured on the beam 17. Thus the rear end of the harvester may be adjusted vertically without interfering with the transmission of power thereto from the tractor. The front end of the harvester is carried or supported by a link 30 which connects it to the crank 31 of a shaft 32 having an adjustably secured hand lever 33, the shaft 32 being arranged on the outer end of the beam 18, so that the front end of the harvester may also be vertically adjusted, as may be desired under various circumstances. The front end of the harvester is braced against and properly spaced away from the tractor 13 by a link bar 34, the inner end of which may be conveniently secured to the tractor as at 35, at which place the radius rods of the steering truck were formally secured.

The harvester proper includes a pair of gathering frames 36, between which is received the standing stalks of corn, a stalk cutting sickle 37, for severing the stalks, and gathering chains 38, 39 and 40, for conveying the severed stalks upwardly and rearwardly over a floor member 41 to the ensilage cutting mechanism. The chains and sickle are operated by suitable means from a shaft 42, but as such means and the general details in construction of the gathering mechanism have been described in a general way in the above mentioned patent they will not again be detailed herein.

The main shaft 22 has a pinion 43 (Fig. 2) which meshes with and drives a gear 44 on a stub shaft 45. The gear 44 has a sprocket pinion 46, which, by a chain 47, drives pinions 48 and 49 on the respective shafts 42 and 50. The shaft 50 extends through to the opposite or tractor side of the harvester and is there provided with a pinion 51 which, by a chain 52, drives pinions 53 and 54, on shafts 55 and 56, respectively. The shaft 56 is a stub shaft which is secured at the end of a link 57 which swings from a center 58, so as to permit, to a limited extent, a freedom of movement to the pinion 54 while being rotated by the chain 52. A gear 59 is arranged on the stub shaft 56 to rotate with the pinion 54, and meshes with and drives a gear 60, on a shaft 61, a radius link 62 being provided to keep the gears 59, 60 in mesh. The shaft 61 is also provided with bearing members 63 which are slidably arranged in parallel slots 64 in the side walls of the harvester. These members 63 are pivotally connected to the ends of a pair of short parallel arms 64ª, which are rigidly secured to a shaft 65, journaled in the harvester, so that they will move simultaneously in the slots 64 and thus effect a floating action of the shaft 61 without interfering with the power transmission for rotating it. One of the members 64ª (see Figs. 2, 3 and 4) is provided with an angularly extending arm 66, which is yieldingly actuated by a spring 67 so as to normally retain the shaft 61 in a forward position.

The shaft 61 has a pair of sprocket gears 68, and corresponding sprocket gears 69 are arranged on a shaft 70, to carry the chains 71 of an apron having angle iron cross slats 72 secured to the chains. The shafts 61 and 70 are secured in spaced parallel positions by a link member 73 which is adjustable as to length, as at 74, so that the distance between the shaft centers may be adjusted, as may be desired for instance when the apron 71—72 is too tight or too slack. The upper end of the feed apron and carrier is also carried so as to allow for an adjustment of back and forth movement or floating action. This is accomplished by means of a pair of brackets 75 which are rigidly secured to and carry the member 73, and pass around to the sides of the rear run of the apron 71—72. These brackets are suspended, by links 76, from parallel arms 77 which are rigid on a shaft 78, journaled as at 79. This shaft 78 has a third arm 80 which is yieldingly actuated by an adjustable spring 81, so as to partly compensate the weight and forward tendency of the feeding mechanism carried by the brackets 75.

The shafts 50 and 55 carry a pair of feeding rollers 82 and 83, which are preferably formed as shown in Figs. 9 and 11. They are irregular and formed with teeth so as to readily engage the incoming stalks and feed them down between the substantially wedge shaped opening or throat (Fig. 9) between the feed rollers and the feed apron, to the ensilage cutter. The roller 28 also acts upon the butt ends of the stalks, as they are delivered from the deck or chute 41, and tends to crowd or pack the butts over against the apron 71, so that the latter will more efficiently force the stalks down into the ensilage cutter. This cutter includes a cylindrical series of cutter blades 84 which are adjustably mounted on a holder 85, secured on the shaft 22. These knives 84 shear against a ledger strip or plate 86, and thus cut the downwardly moving stalks into small pieces, which, guided by a plate 87 are agitated down and rearwardly to a conveyor presently to be described.

The object of floating the feed apron and giving it the rearwardly yieldable action, as has been described above, is to prevent chocking of the stalks between the apron and the feed rollers. Under normal circumstances the speed of the feeding mechanism can be properly proportioned to the forward speed or motion of the harvester, and but little fluctuation in the position of the apron will take place. It is frequently the case, however, that a harvester, in its course over a large field, will come into contact with unusually heavy growths of corn, and when such is the case the machine will have to handle the increase, which it can very readily do when equipped with our improved floating feed apron.

As the cut ensilage leaves the cutter and the lower end of the plate 87, it is delivered into the lower forward end of a rearwardly inclined conveyor casing 88, in which is mounted an endless carrier 89, driven by a sprocket chain 90 from a pinion 91 on the drive shaft 22. The upper end of the conveyor is adjustably supported by a chain 92 which is detachably secured, for adjustment, to a bracket arm 93 which extends up from the container or box 16. The lower run of the endless carrier moves upwardly, and in doing so engages the cut ensilage and moves it upwardly over the floor of the conveyor 88 to its upper end, where the ensilage is dropped upon a second or horizontal conveyor 94, having an endless carrier 95. This conveyor is preferably long enough so that it will extend, when in a transverse position, beyond the truck box 16 (Figs. 1 and 8), and thus permit the ensilage to be delivered into an auxiliary wagon or truck (not shown) on the left or stubble side of the machine, which is especially desirable when the box 16 has been filled. The box 16 is filled either by swinging the outer or left end of the conveyor 94 to the front end of the box, or by providing the floor 96 (under the upper run of the carrier 95) with a removable trap door 97. One end of the transverse conveyor is adjustably supported by a chain 98 from a bracket arm 99, while the other end is pivotally supported on the carrier (95) drive shaft 100, which is journaled in a yoke 101, mounted on a vertical pivot consisting of a shaft 102 journaled in a casting 103 secured to the inclined conveyor 88. The vertical shaft 102 is driven by the shaft 104 of the upper end of the carrier 89, by bevel pinions 105, and in turn drives the shaft 100 by means of bevel pinions 106. Thus the carrier 95 is simultaneously driven with and by the carrier 89 regardless of the shifted or adjusted position of the conveyor 94.

While we have now illustrated and described the preferred embodiment of our invention, it is obvious that various changes in form, proportions, general design and structural details may be resorted to within the scope of the appended claims without departing from the principles of the invention involved.

Having now therefore fully set forth our invention and its preferred embodiment, what we claim to be new and desire to protect by Letters Patent is:

1. In a harvester, having an ensilage cutter, means for feeding stalks to the cutter while said stalks are in an upright position, said means including feed rollers and an endless apron co-operating therewith, both ends of said apron being yieldably held toward the rollers and movable with respect thereto.

2. In a harvester, having an ensilage cutter, means for feeding stalks downwardly into the cutter, said means including a pair of rotating members and an endless apron co-operating at its lower end therewith, the entire working surface of the apron being movable with respect to said members and normally held toward the same.

3. In a harvester, having an ensilage cutter, means for feeding stalks downwardly into the cutter, said means including simultaneously actuated feeding devices arranged to form a tapering throat for receiving the stalks and impelling the stalks toward the cutter, one of said devices being operable in a plane which is rearwardly and yieldingly movable so that said throat may be enlarged or reduced to accommodate fluctuating quantities of stalks passing to the cutter.

4. In a harvester, having an ensilage cutter, means for feeding stalks downwardly into the cutter, said means comprising a pair of feed rollers and an endless member co-operating therewith, spring actuated means for movably mounting the entire member with respect to the feed rollers, and means for actuating the endless member.

5. In a traveling harvester the combination of a stalk cutter and an ensilage cutter, means for conveying the stalks rearwardly from the stalk cutter and delivering them downwardly into the ensilage cutter, said means including feeding devices arranged to form a tapering throat through which the stalks are passed, one of said devices being yieldingly pressed forwardly whereby said throat will be self adjusting to accommodate fluctuating quantities of stalks coming from the stalk cutter.

6. In a harvester, having an ensilage cutter, a feeding device arranged adjacent to the cutter and including an endless apron, a frame for operatively mounting the apron, adjustable means for independently and yieldingly mounting the opposite ends of the apron frame whereby either or both ends of the apron will be self adjusting, and means for actuating the apron.

7. In a harvester, having an ensilage cutter, a feeding mechanism arranged over the cutter and adapted to feed stalks butt ends first downwardly into the cutter, said mechanism including a substantially vertical frame having a shaft at each end and an endless apron carried by the shafts, a feed roller co-operating with the lower part of the apron, said apron part being yieldingly movable with respect to the roller, and means for applying power to the lower shaft of the apron frame.

8. In a harvester, having an ensilage cutter, a feeding mechanism arranged over the cutter and adapted to feed stalks downwardly thereinto, said feeding mechanism comprising a feed roller and an endless apron co-operating therewith, uniformly spaced parallel shafts arranged to carry the apron, and floating bearing members arranged to carry both of said apron shafts.

9. In a harvester, having an ensilage cutter, a feeding mechanism arranged over the cutter and adapted to feed stalks downwardly thereinto, said feeding mechanism including a feed roller, an endless substantially vertical apron co-operating with the feed roller, a mounting device for yieldingly supporting the lower part of the apron in an adjustable position with respect to the feed roller, and means associated with the mounting device for actuating the apron.

10. In a harvester, having an ensilage cutter, a feeding mechanism arranged over the cutter and adapted to feed stalks downwardly thereinto, said feeding mechanism including a feed roller, an endless substantially vertical apron co-operating with the feed roller, a mounting device for yieldingly supporting the lower part of the apron in an adjustable position with respect to the feed roller, means associated with the mounting device for actuating the apron, a shaft at the upper part of the apron, and a pair of movable bearing members for adjustably supporting said shaft.

11. A harvester having an ensilage cutter, a feeding device adapted to receive stalks and feed them downwardly into the cutter, said feeding device consisting of an endless apron mounted on parallel shafts, and a pair of feed rollers forming a passage for stalks between the apron and rollers, yieldably movable bearing members for both of said shafts, whereby the entire apron is rendered yieldably self adjustable with respect to said rollers as stalks are being fed through the stalk passage, and means for actuating the feeding device.

12. In a traveling ensilage harvester the combination of a stalk cutter for severing the stalks from the field, an ensilage cutter for cutting the stalks into ensilage, means for conveying the stalks from the stalk cutter to a substantially upright position above the ensilage cutter, a power driven apron and a pair of feed rolls arranged to receive the stalks when in said upright position and feed them down into the ensilage cutter, the entire body of said apron having a yielding action whereby it may yield to a variable volume of stalks delivered by the conveying means.

13. In a traveling ensilage harvester the combination of a stalk cutter for severing the stalks from the field, an ensilage cutter for cutting the stalks into ensilage, means for conveying the stalks from the stalk cutter to a substantially upright position above the ensilage cutter, a feeding mechanism for feeding the stalks, when in said upright position, down into the ensilage cutter, said feeding mechanism having a substantially upright portion which receives the stalks from the conveying means and by a rake acting motion impels them downwardly, said upright portion of the feeding mechanism being yieldable throughout its length whereby it may yield to a variable volume of stalks delivered by the conveying means.

14. In a traveling ensilage harvester the combination of a stalk cutter for severing the stalks from the field, an ensilage cutter for cutting the stalks into ensilage, means for conveying the stalks from the stalk cutter to a substantially upright position above the ensilage cutter, a feeding mechanism for feeding the stalks, when in said upright position, down into the ensilage cutter, said feeding mechanism having a substantially upright portion which receives the stalks from the conveying means and by a rake acting motion impels them downwardly, said upright portion of the feeding mechanism being yieldable throughout its length whereby it may yield to a variable volume of stalks delivered by the conveying means, and means acting upon the butt ends of the stalks for packing them toward the upright portion of the feeding mechanism.

15. In a traveling ensilage harvester the combination of a stalk cutter for severing the stalks from the field, an ensilage cutter for cutting the stalks into ensilage, means for conveying the stalks from the stalk cutter to a substantially upright position above the ensilage cutter, a feeding mechanism for feeding the stalks, when in said upright position, down into the ensilage cutter, said feeding mechanism having a substantially upright portion which receives the stalks from the conveying means and by a rake acting motion impels them downwardly, said upright portion of the feeding mechanism being yieldable throughout its length whereby it may yield to a variable volume of stalks delivered by the conveying means, and means acting upon the butt ends of the stalks for crowding them into the feeding mechanism.

16. In a traveling ensilage harvester the combination of a stalk cutter for severing the stalks from the field, an ensilage cutter for cutting the stalks into ensilage, means for conveying the stalks from the stalk cutter to a feeding position with respect to the ensilage cutter, a feeding mechanism comprising a power driven apron and a co-operating feed roll arranged to receive the stalks when in said feeding position and feed them into the ensilage cutter, the entire body of said apron having a yielding action whereby it may yield to a variable volume of stalks delivered by the conveying means.

17. In a traveling ensilage harvester the combination of a stalk cutter for severing the stalks from the field, an ensilage cutter for cutting the stalks into ensilage, means for conveying the stalks from the stalk cutter to a feeding position with respect to the ensilage cutter, a power driven apron and a feed roll arranged to receive the stalks when in said feeding position and force them into the ensilage cutter, the entire body of said apron having a yielding action whereby it may yield to a variable volume of stalks delivered by the conveying means, and means acting upon the butt ends of the stalks for crowding them against the feed apron.

18. In a traveling ensilage harvester the combination of a stalk cutter for severing the stalks from the field, an ensilage cutter for cutting the stalks into ensilage, means for conveying the stalks from the stalk cutter to a feeding position with respect to the ensilage cutter, a feeding device having a rake acting portion adapted to receive said stalks when in said feeding position, and feed them into said ensilage cutter, said rake acting portion of the feeding device being yieldable throughout its length, whereby it may yield at either or both ends to a variable volume of stalks delivered by the conveying means.

In testimony whereof we affix our signatures.

ANDREAN G. RONNING.
ADOLPH RONNING.